(12) United States Patent
Tharammel et al.

(10) Patent No.: US 12,197,450 B1
(45) Date of Patent: Jan. 14, 2025

(54) SYSTEMS AND METHODS FOR GENERATING HIGH PERFORMANT DAILY SNAPSHOTS AND TREND ANALYSIS ON LARGE SCALE DATA MARTS

(71) Applicant: Massachusetts Mutual Life Insurance Company, Springfield, MA (US)

(72) Inventors: Nabeel Kodiyil Tharammel, Springfield, MA (US); Suresh Babu Punna, Springfield, MA (US); Israel Abraham, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 17/960,673

(22) Filed: Oct. 5, 2022

(51) Int. Cl.
- *G06F 16/00* (2019.01)
- *G06F 16/242* (2019.01)
- *G06F 16/2458* (2019.01)
- *G06F 16/28* (2019.01)

(52) U.S. Cl.
CPC ........ *G06F 16/2474* (2019.01); *G06F 16/244* (2019.01); *G06F 16/283* (2019.01)

(58) Field of Classification Search
CPC ... G06F 16/2474; G06F 16/244; G06F 16/283
USPC .................................................. 707/600–899
See application file for complete search history.

(56) References Cited

U.S. PATENT DOCUMENTS

| | | |
|---|---|---|
| 2014/0019168 A1* | 1/2014 | Albert ................... G06Q 10/10 705/4 |
| 2019/0095850 A1* | 3/2019 | Diehl ............. G06Q 10/063114 |
| 2022/0005121 A1* | 1/2022 | Hayward ............... G06N 3/044 |

* cited by examiner

Primary Examiner — Irete F Ehichioya
Assistant Examiner — Shirley D Hicks
(74) Attorney, Agent, or Firm — Foley & Lardner LLP

(57) ABSTRACT

A system may include a processor configured to receive a first set of data indicating a first period of time during which a item has a first status, and a second period of time during which the item has a second status. The processor may generate, based on the first set of data, a second set of data containing a plurality of logical rows, each indicating an encoded value of the first status of the item and an encoded value of the second status of the item during a respective period of time that is smaller than or equal to each of the first period of time and the second period of time. The processor may cause a display to present, based on the first set of data and the second set of data, statistical information of the first status and the second status during a third period of time.

20 Claims, 10 Drawing Sheets

| | C1 121<br>Policy Number | C2 122<br>Insured Name | C3 123<br>Status | C4 124<br>Begin Date | C5 125<br>End Date |
|---|---|---|---|---|---|
| R1 111 | 1234 | John Smith | New | 1/1/2021 | 1/15/2021 |
| R2 112 | 1234 | John Smith | Pending | 1/16/2021 | 1/20/2021 |
| R3 113 | 2345 | John Smith | Closed | 1/21/2021 | 10/25/2021 |

100

| | C1 181<br>Case Date | C2 182<br>Closed | C3 183<br>New | C4 184<br>Pending | C5 185<br>Total Cases |
|---|---|---|---|---|---|
| R1 161 | 1/1/2021 | 0 | 6 | 1,281 | 1,287 |
| R2 162 | 1/2/2021 | 0 | 11 | 1,287 | 1,298 |
| R3 163 | 1/3/2021 | 0 | 12 | 1,298 | 1,310 |
| R4 164 | 1/4/2021 | 98 | 86 | 1,220 | 1,402 |
| R5 165 | 1/5/2021 | 166 | 54 | 1,174 | 1,387 |
| R6 166 | 1/6/2021 | 105 | 66 | 1,145 | 1,308 |
| R7 167 | 1/7/2021 | 104 | 57 | 1,139 | 1,286 |
| R8 168 | 1/8/2021 | 82 | 51 | 1,125 | 1,257 |
| R9 169 | 1/9/2021 | 0 | 11 | 1,175 | 1,186 |
| R10 170 | 1/10/2021 | 0 | 14 | 1,186 | 1,200 |

Table 200:

| | C1 221 Key | C2 222 Check # | C3 223 Insured Name | C4 224 Transaction Date | C5 225 Status | C6 226 Amount | C7 227 Begin Date | C8 228 End Date |
|---|---|---|---|---|---|---|---|---|
| R1 211 | 1234 | 140 | John Smith | | Waiting to Post | 100 | 10/1/2021 | 10/15/2021 |
| R2 212 | 1234 | 140 | John Smith | 10/1/2021 | Outstanding | 100 | 10/16/2021 | 10/30/2021 |
| R3 213 | 2345 | 145 | John Smith | 10/7/2021 | Cleared | 200 | 10/1/2021 | 10/15/2021 |
| R4 214 | 2345 | 670 | Cooper | 10/10/2021 | Cleared | 100 | 10/10/2021 | 11/3/2021 |

Table 250:

| | C1 271 Date | C2 272 Cleared | C3 273 Outstanding | C4 274 Void | C5 275 Waiting To Post |
|---|---|---|---|---|---|
| R1 261 | 1/3/2022 | 1,653,980 | 23,088 | 7,493 | 50 |
| R2 262 | 1/4/2022 | 1,653,982 | 23,090 | 7,495 | 54 |
| R3 263 | 1/5/2022 | 1,653,985 | 23,092 | 7,497 | 35 |
| R4 264 | 1/6/2022 | 1,653,986 | 23,094 | 7,499 | 58 |
| R5 265 | 1/7/2022 | 1,653,987 | 23,096 | 7,501 | 75 |
| R6 266 | 1/8/2022 | 1,653,988 | 23,098 | 7,503 | 80 |
| R7 267 | 1/9/2022 | 1,653,989 | 23,100 | 7,505 | 90 |
| R8 268 | 1/10/2022 | 1,653,990 | 23,102 | 7,507 | 95 |

*Fig. 2 – Prior Art*

| | C1 521 Key | C2 522 Check # | C3 523 Party ID | C4 524 Transaction | C5 525 Status | C6 526 Amount | C7 527 Begin Date | C8 528 End Date |
|---|---|---|---|---|---|---|---|---|
| R1 511 | 1234 | 145 | John Smith | 10/1/2021 | Waiting to Post | 100 | 10/1/2021 | 10/5/2021 |

500

| | C1 571 Key | C2 572 As of Date | C3 573 Check # | C4 574 Party ID | C5 575 Transaction | C6 576 Status | C7 577 Amount | C8 578 Begin Date | C9 579 End Date |
|---|---|---|---|---|---|---|---|---|---|
| R1 561 | 1234 | 10/1/2021 | 145 | John Smith | 10/1/2021 | Waiting to Post | 100 | 10/1/2021 | 10/5/2021 |
| R2 562 | 1234 | 10/2/2021 | 145 | John Smith | 10/1/2021 | Waiting to Post | 100 | 10/1/2021 | 10/5/2021 |
| R3 563 | 1234 | 10/3/2021 | 145 | John Smith | 10/1/2021 | Waiting to Post | 100 | 10/1/2021 | 10/5/2021 |
| R4 564 | 1234 | 10/4/2021 | 145 | John Smith | 10/1/2021 | Waiting to Post | 100 | 10/1/2021 | 10/5/2021 |
| R5 565 | 1234 | 10/5/2021 | 145 | John Smith | 10/1/2021 | Waiting to Post | 100 | 10/1/2021 | 10/5/2021 |

| | C1 621 Key | C2 622 Check # | C3 623 Insured Name | C4 624 Check Date | C5 625 Status | C6 626 Amount | C7 627 Begin Date | C8 628 End Date |
|---|---|---|---|---|---|---|---|---|
| R1 611 | 1234 | 165 | John Smith | 10/1/2021 | Waiting to Post | 100 | 10/1/2021 | 10/5/2021 |
| R2 612 | 1234 | 165 | John Smith | 10/1/2021 | Outstanding | 100 | 10/6/2021 | 10/8/2021 |
| R3 613 | 1234 | 165 | John Smith | 10/1/2021 | Cleared | 100 | 10/9/2021 | 10/9/2021 |
| R4 614 | 5678 | 561 | John Doe | 10/7/2021 | Waiting to Post | 200 | 10/7/2021 | 10/7/2021 |
| R5 615 | 5678 | 561 | John Doe | 10/7/2021 | Outstanding | 200 | 10/8/2021 | 10/8/2021 |
| R6 616 | 5678 | 561 | John Doe | 10/7/2021 | Cleared | 200 | 10/9/2021 | 10/9/2021 |

600

| | C1 661 Key | C2 652 As of Date | C3 653 Waiting to Post | C4 654 Outstanding | C5 655 Cleared |
|---|---|---|---|---|---|
| R1 631 | 1234 | 10/1/2021 | 1 | 0 | 0 |
| R2 632 | 1234 | 10/2/2021 | 1 | 0 | 0 |
| R3 633 | 1234 | 10/3/2021 | 1 | 0 | 0 |
| R4 634 | 1234 | 10/4/2021 | 1 | 0 | 0 |
| R5 635 | 1234 | 10/5/2021 | 1 | 0 | 0 |
| R6 636 | 1234 | 10/6/2021 | 0 | 1 | 0 |
| R7 637 | 1234 | 10/7/2021 | 0 | 1 | 0 |
| R8 638 | 1234 | 10/8/2021 | 0 | 1 | 0 |
| R9 639 | 1234 | 10/9/2021 | 0 | 0 | 1 |
| R10 640 | 5678 | 10/7/2021 | 1 | 0 | 0 |
| R11 641 | 5678 | 10/8/2021 | 0 | 1 | 0 |
| R12 642 | 5678 | 10/9/2021 | 0 | 0 | 1 |

|  | C1 691 Key | C2 692 As of Date | C3 693 Check # | C4 694 Insured Name | C5 695 Check Date | C6 696 Amount | C7 697 Waiting to Post | C8 698 Outstanding | C9 699 Cleared |
|---|---|---|---|---|---|---|---|---|---|
| R1 671 | 1234 | 10/1/2021 | 165 | John Smith | 10/1/2021 | 100 | 1 | 0 | 0 |
| R2 672 | 1234 | 10/2/2021 | 165 | John Smith | 10/1/2021 | 100 | 1 | 0 | 0 |
| R3 673 | 1234 | 10/3/2021 | 165 | John Smith | 10/1/2021 | 100 | 1 | 0 | 0 |
| R4 674 | 1234 | 10/4/2021 | 165 | John Smith | 10/1/2021 | 100 | 1 | 0 | 0 |
| R5 675 | 1234 | 10/5/2021 | 165 | John Smith | 10/1/2021 | 100 | 1 | 0 | 0 |
| R6 676 | 1234 | 10/6/2021 | 165 | John Smith | 10/1/2021 | 100 | 0 | 1 | 0 |
| R7 677 | 1234 | 10/7/2021 | 165 | John Smith | 10/1/2021 | 100 | 0 | 1 | 0 |
| R8 678 | 1234 | 10/8/2021 | 165 | John Smith | 10/1/2021 | 100 | 0 | 1 | 0 |
| R9 679 | 1234 | 10/9/2021 | 165 | John Smith | 10/1/2021 | 100 | 0 | 0 | 1 |
| R10 680 | 5678 | 10/7/2021 | 561 | John Doe | 10/7/2021 | 200 | 1 | 0 | 0 |
| R11 681 | 5678 | 10/8/2021 | 561 | John Doe | 10/7/2021 | 200 | 0 | 1 | 0 |
| R12 682 | 5678 | 10/9/2021 | 561 | John Doe | 10/7/2021 | 200 | 0 | 0 | 1 |

*Fig. 6B*

SYSTEMS AND METHODS FOR GENERATING HIGH PERFORMANT DAILY SNAPSHOTS AND TREND ANALYSIS ON LARGE SCALE DATA MARTS

TECHNICAL FIELD

This application is generally directed towards a data processing/analysis system, and more specifically towards systems and methods for tracking data changes over a period using data generated over a plurality of subperiods of the period.

BACKGROUND

A data analysis system (e.g., enterprise data analytics program (EDAP)) can perform using data warehouse (e.g., enterprise data warehouse (EDW)) to create analytical reports for individuals or enterprises. For example, an EDW may store current and historical data in one single place to be used for a trend analysis for a given period. There is a need for the data analysis system to reduce an execution time when the size of the input data is large (e.g., "big datasets" that are spanning across a long period).

SUMMARY

Disclosed herein are systems and methods capable of addressing the above-described shortcomings and may also provide any number of additional or alternative benefits and advantages. Embodiments described herein provide for systems and methods that track data changes over a period using data generated over a plurality of subperiods (e.g., divided portions or subdivisions) of the period. The embodiments herein aim to reduce the execution time for tracking data changes (e.g., tracking daily trends on the status of an item over a period) in datasets having a large size. The item may be any data item or data record having one of a plurality of statuses at a given time.

In an embodiment, a method may include receiving, by one or more processors, a first set of data indicating a first period of time during which a first item has a first status, and a second period of time during which the first item has a second status. The method may include generating, by the one or more processors based on the first set of data, a second set of data containing a plurality of logical rows, each indicating an encoded value of the first status of the first item and an encoded value of the second status of the first item during a respective period of time that is smaller than or equal to each of the first period of time and the second period of time. The method may include causing, by the one or more processors, a display to present, based on the first set of data and the second set of data, statistical information of the first status and statistical information of the second status during a third period of time.

In another embodiment, a system may include one or more processors. The one or more processors may be configured to execute instructions stored on a non-transitory computer-readable medium. The one or more processors may be configured to receive a first set of data indicating a first period of time during which a first item has a first status, and a second period of time during which the first item has a second status. The one or more processors may be configured to generate, based on the first set of data, a second set of data containing a plurality of logical rows, each indicating an encoded value of the first status of the item and an encoded value of the second status of the item during a respective period of time that is smaller than or equal to each of the first period of time and the second period of time. The one or more processors may be configured to cause a display to present, based on the first set of data and the second set of data, statistical information of the first status and the second status during a third period of time.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the subject matter described herein.

FIG. 1 is a diagram depicting example input/output data for tracking changes in the status of insurance policy over a period.

FIG. 2 is a diagram depicting example input/output data for tracking changes in the status of checks over a period.

FIG. 5 is a diagram depicting example data for tracking data changes over a period, according to an embodiment.

FIG. 6A and FIG. 6B are diagrams depicting another example data for tracking data changes over a period, according to an embodiment.

DETAILED DESCRIPTION

Figure 3A:
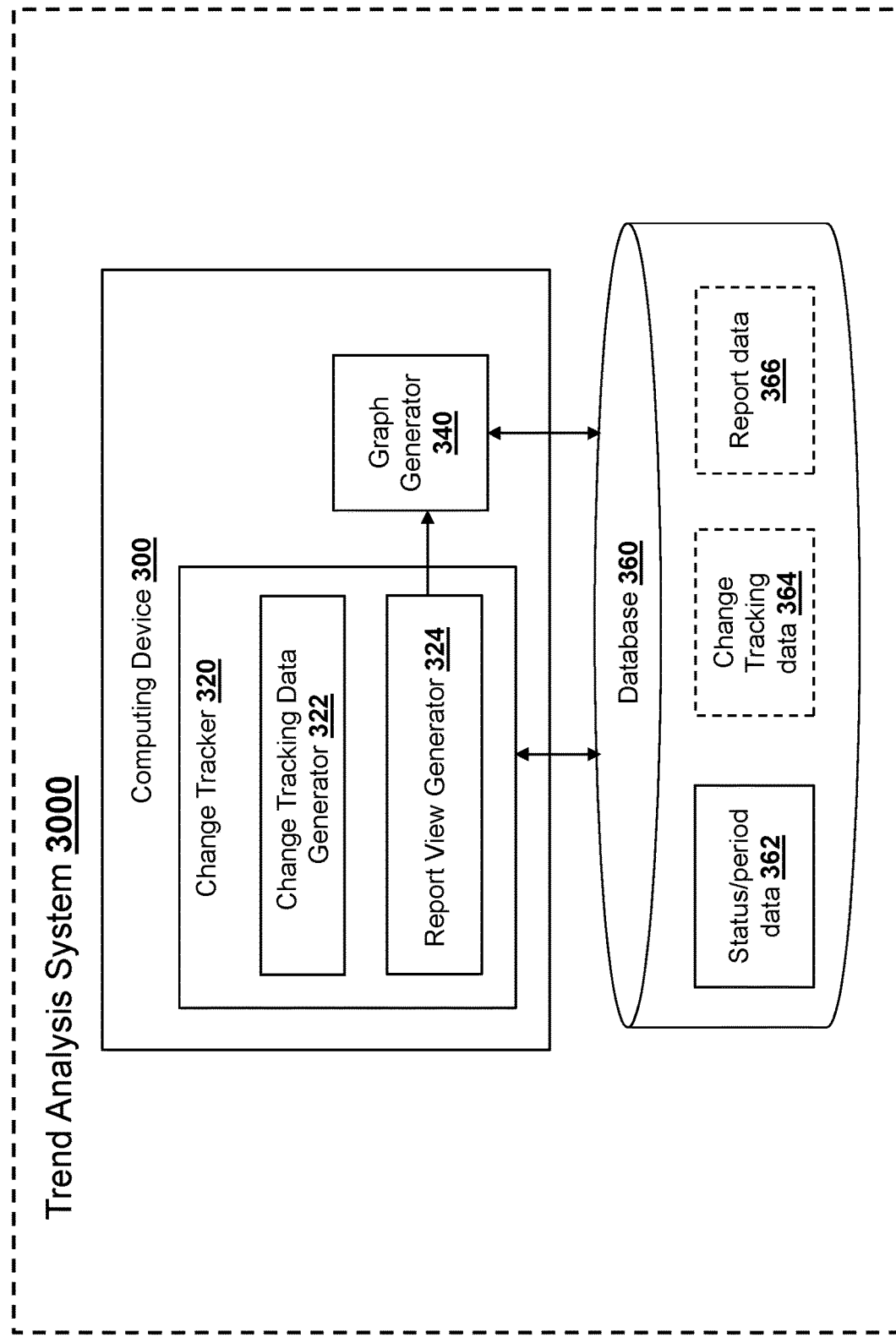
FIG. 3A is a block diagram showing a system for tracking data changes over a period, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein generally relate to systems and methods that track data changes over a period using data generated over a plurality of subperiods of the period (e.g., daily data generated over the days of a 3 month period). Embodiments disclosed herein describe a system including one or more processors. The one or more processors may be configured to execute instructions stored on a non-transitory computer-readable medium. The one or more processors may be configured to receive a first set of data (e.g., a logical table) indicating a first period of time during which a first item has a first status (e.g., a check status such as "cleared", "outstanding" or "waiting to post"), and a second period of time during which the first item has a second status. The one or more processors may be configured to generate, based on the first set of data, a second set of data containing a plurality of logical rows (e.g., rows in a logical table), each indicating an encoded value of the first status of the item and an encoded value of the second status of the item during a respective period of time (e.g., during a respective day of a given period) that is smaller than or equal to each of the first period of time and the second period of time. The one or more processors may be configured to cause a display to present, based on the first set of data and the second set of data, statistical information of the first status and the second status during a third period of time (e.g., daily number of checks with status "cleared").

One problem relates to processing data to track data changes over a period. For example, FIG. 1 is a diagram depicting example input/output data for tracking changes in the status of insurance policies over a period, in an enterprise portal (e.g., digital operations portal) where users may want to see the daily trends on the status of insurance policy (of a user) over a period. Referring to FIG. 1, a system for the enterprise portal may receive an input table 100 including rows R1 (111)-R3 (113), each having columns C1 (121)-C5 (125) including a status 123 of an insurance policy 121 associated with an insured name 122 and a corresponding period defined with a begin date 124 and an end date 125. The system may generate, based on the input table 100, an output table 150 for trend analysis. The output table 150 may include rows R1 (161)-R10 (170), each having columns C1 (181)-C5 (185) including a date of a day 181, the respective number of policies on that day with status "closed" 182, "new" 183 and "pending" 184, and the total number of policies on that day 185.

Another example of processing data to track data changes over a period is shown in FIG. 2, which is a diagram depicting example input/output data for tracking changes in the status of checks over a period, in an enterprise portal (e.g., institutional solutions portal) which shows either the daily number of checks per status over the period or the daily sum of the amount of checks per status over the period. Referring to FIG. 2, a system may receive an input table 200 including rows R1 (211)-R4 (214), each having columns C1 (221)-C5 (228) including a key 221, a transaction date 224, an amount 226, and a status 225 of a check 222 associated with an insured name 223 and a corresponding period defined with a begin date 227 and an end date 228. The system may generate, based on the input table 200, an output table 250 for trend analysis. The output table 250 may include rows R1 (261)-R8 (268), each having columns C1 (271)-C5 (275) including a date of a day 271, the number of checks 275 with status "waiting to post" on that day, and the respective sum of the amount of checks on that day with status "cleared" 272, "outstanding" 273 and "void" 274.

Referring to FIG. 1 and FIG. 2, the system may receive status data (e.g., status 123, 225) with a period (e.g., begin date 124, 227 and end date 125, 228) and generate daily trend data (e.g., number of policies per status 182-183, or sum of the amount of checks per status 272-274). When the input data (e.g., input tables 100, 200) includes big/large datasets that are spanning across a date range, or data sets that are spanning across a long period of time, it may take long time to execute underlying query (e.g., structured query language (SQL)) to generate daily trend output data (e.g., output tables 150, 250). There is a need for efficiently generating daily trend data even with input data of big datasets or datasets with status for a long period of time.

To solve these problems, according to certain aspects, embodiments in the present disclosure relate to techniques for tracking data changes over a period using data generated over a plurality of subperiods (e.g., divided portions or subdivisions) of the period. For example, data changes over a 3 month period may be tracked using (daily) data generated over each day of the 3 month period.

In a first embodiment, given a status with a corresponding period in an input table, a trend analysis system may create/generate a snapshot view (or change tracking view) which can show/portray/indicate the daily status of an item (e.g., an insurance policy or a check) as rows having repeated records over subperiods of the period (e.g., days of a 3 months period). The snapshot view or change tracking view may be created/generated as a result of a database query (e.g., SQL). Given a plurality of records or rows in an input table, each record representing/indicating a status of the item with a corresponding period defined with a begin date and an end date, the trend analysis system may create/generate a change tracking view by replicating/repeating/accumulating each record in the input table n times between the begin date and the end date (e.g., n is the number of days between the begin date and the end date). In some embodiments, the change tracking view may be implemented as a logical view in an enterprise data analytics program (EDAP) using an enterprise data warehouse (EDW). The input table may include a large number of records (e.g., 50 million records). In some embodiments, the system may use a column representing a date (e.g., "as of date" column) to report the status of the items for any given day. The first embodiment can be easy to implement (by replicating the same record over subperiods of a period) and may not incur much burden to build and maintain additional data points (because the input records can be replicated to be maintained in the change tracking view). The first embodiment, however, may use large computing resources (e.g., processor, memory, or disk) because the number of duplicate records increases exponentially for input records associated with a given period. For example, in some implementation, it may take 20 minutes to build an intermediate data structure (e.g., change tracking table) for all check transactions for a 10 day time period.

In a second embodiment, a trend analysis system may obtain a result of a database query in a manner similar to the first embodiments, but store the result in one or more physical tables (or projections) instead of creating/generating a view as done in the first embodiment. For example, given a status with a corresponding period in an input table, the trend analysis system may create/generate a snapshot table or projection (or change tracking table or projection) which can show/portray/indicate the daily status of an item (e.g., an insurance policy or a check) as rows having repeated records over subperiods of the period (e.g., days of a 3 months period). The change tracking table or projection may be built/created/generated as a static projection for a pre-determined set of as-of-dates so as to enforce a database system to reference the table or projection created. In this manner, the trend analysis system can store result sets of a database query in a disk (as the change tracking table or projection) rather than computing the result sets each time the query is used in a program. The database system may automatically refresh/update these result sets whenever input data are updated or new input data are received. The second embodiment can utilize additional projections on existing tables without replicating/repeating/accumulating data points programmatically. The second embodiment, however, may need frequent refreshes/updates on the projections, which may incur an input/output (I/O) overload processing job, so that the memory and I/O overhead are not reduced as compared with the first embodiment.

In a third embodiment, instead of building an accumulating snapshot view (or table/projection), a trend analysis system may create/generate a bitmap table (as a change tracking table) that tracks the record status or status change for each subperiod of a given period (e.g., for each day of a 3 months period). For every record given in an input table, the system may create one or more physical change tracking tables that track/indicate/show the change in status using a binary flag (e.g., 0 or 1). In some embodiments, the change in status may be tracked/indicated/shown by any column whose cardinality is 2 (e.g., the number of unique values in the column is 2). The column for use in tracking the change in status may have one of an integer type or a binary type. The system may create one or more change tracking views (instead of physical tables) that track/indicate/show the change in status using a binary flag. The system may create/generate a report view by combining or joining the input table and the change tracking table. The report view may be used to report or track status change over a given period (e.g., change in status of checks over a 3 months period).

In one scenario, a check that has been paid by an insurance subscriber may go through multiple stages. When the check is given by the insured subscriber, the check may first go to a bank for collection; and if the check satisfies required conditions (e.g., there must be sufficient funds in the insurance subscriber's account at the bank), the check may become cleared by the bank. In these stages, there may be three possible statuses of a check: "outstanding", "cleared" and "waiting to post". In some embodiments, when the check is sent to an insurance company, a trend analysis system may indicate/display/show the status as "waiting to post". Once the check is sent to bank, the status may be changed to "outstanding". In the final stage, once the insurance company receives the money, the check may become cleared and shown as "cleared" by the system.

In some embodiments, the trend analysis table may track the status change of a check (e.g., subscriber or person's check) during a transaction. The system may receive data as an input table, which indicates status changes of one or more checks for a given period. In order to report a change of the status over the given period, the system may create a bitmap table (as a change tracking table) to track only the change of the status (without other information such as amount of the check, check number, etc.). The system may track the status change using one or more columns of an integer type or a binary type in a change tracking table, the footprint (e.g., storage space) of the change tracking table can be very light. In some embodiments, the one or more columns may be added (or stored) to a physical table if additional status records are getting added. In some embodiments, the system may join the input table and the bitmap table (as a change tracking table) to create/generate a report view for reporting purpose.

In some embodiments, the trend analysis system may generate one or more graphs based on a change tracking table or a report view. Based on a change tracking table or a report view, the system can generate statistical information (e.g., total number of checks per status for each day, or sum of check amounts per status for each day). In some embodiments, the system may generate/calculate/compute the total number checks per status for each day by summing up the columns level for each day (e.g., counting the records with a value of 1 in "waiting to post" column, the "outstanding" column, and "cleared" column in the change tracking table or the report view) in the change tracking table or the report view. In some embodiments, the system may generate/calculate/compute the sum of check amounts per status for each day by (1) multiplying an amount column and a status column (e.g., "waiting to post" column, the "outstanding" column, and "cleared" column in the report view) in each record of the report view; and (2) aggregating or summing up the multiplication results on a given time (e.g., particular day) as the sum of amount pending in a given status on the given time.

In some embodiments, the trend analysis system may calculate/obtain/compute the total number of checks per status for each day of a given period by counting the records with a value of 1 in each status column (e.g., "waiting to post" column, the "outstanding" column, and "cleared" column) for each day of a given period (e.g., 3 months period) in a change tracking table or a report view/table. The system may then generate (1) a graph (e.g., line graph) representing the changes in the total number of checks with the "cleared" status; (2) a graph (e.g., line graph) representing the changes in the total number of checks with the "outstanding" status; and (3) a graph (e.g., line graph) representing the changes in the total number of checks with the "waiting to post" status, for a given period of time (e.g., 3 months period).

According to certain aspects, a system may include one or more processors configured to execute instructions stored on a non-transitory computer-readable medium. The one or more processors may be configured to receive a first set of data indicating a first period of time during which a first item has a first status, and a second period of time during which the first item has a second status. The one or more processors may be configured to generate, based on the first set of data, a second set of data containing a plurality of logical rows, each indicating an encoded value of the first status of the item and an encoded value of the second status of the item during a respective period of time that is smaller than or equal to each of the first period of time and the second period of time. The one or more processors may be configured to cause a display to present, based on the first set of data and the second set of data, statistical information of the first status and the second status during a third period of time.

The first item may be one of an insurance policy or a check of an insured person. In some embodiments, the respective period has an identical length.

Each of the plurality of logical rows in the second set of data may include the encoded value of the first status of the first item as a value of a first logical column, and the encoded value of the second status of the first item as a value of a second logical column. The one or more processors may be configured to calculate the statistical information of the first status by summing values of the first logical column over the respective period of time. The one or more processors may be configured to calculate the statistical information of the second status by summing values of the second logical column over the respective period of time.

Each of the plurality of logical rows in the second set of data may further include an amount relating to the first item as a value of a third logical column. The one or more processors may be configured to multiply, in each of the plurality of logical rows, the value of the first logical column by the value of the third logical column to obtain a respective multiplication result. The one or more processors may be configured to calculate the statistical information of the first status by summing respective multiplication results over the respective period of time.

The first set of data may contain a first logical row including the first status of the first item as a value of a status column and the first period of time as a value of a period column. The first set of data may contain a second logical row including the second status of the first item as a value of the status column and the second period of time as a value of the period column.

The first set of data further may indicate a fourth period of time during which a second item has the first status, and a fifth period of time during which the second item has the second status. Each of the plurality of logical rows in the second set of data may include an encoded value of the first status of the first item or the second item as a value of a first logical column, and an encoded value of the second status of the first item or the second item as a value of a second logical column. The one or more processors may be configured to calculate the statistical information of the first status by summing values of the first logical column over the respective period of time. The one or more processors may be configured to calculate the statistical information of the second status by summing values of the second logical column over the respective period of time.

Each of the plurality of logical rows in the second set of data may further include an amount relating to the first item or the second item as a value of a third logical column. The one or more processors may be configured to multiply, in each of the plurality of logical rows, the value of the first logical column by the value of the third logical column to obtain a respective multiplication result. The one or more processors may be configured to calculate the statistical information of the first status by summing respective multiplication results over the respective period of time.

Embodiments in the present disclosure can have the following advantages. First, some embodiments can provide useful techniques for reducing the execution time for tracking data changes (e.g., tracking daily trends on the status of an insurance policy over a period) in datasets having a large size. A trend analysis system according to some embodiments can efficiently aggregate/combine data sets over a long period (e.g., several months of data sets) using a bitmap table, improving the performance and scalability of the trend analysis system. For example, in an implementation, while conducting a proof of concept (POC), a trend analysis system used 1.3 billion rows in the input table for a 3-month time period, and it took only 30-40 seconds for the system to execute a query on the input table. In another implementation, the system increased the performance of the resulting query by reducing the execution or running time from several minutes to less than 30 seconds.

Second, some embodiments can provide useful techniques for tracking data changes in datasets having a large size, without incurring excessive memory/disk overhead. For example, a trend analysis system according to some embodiments may add only the incremental data (e.g., data in status columns) on the index table without all the columns in the input table.

FIG. 3A is a block diagram showing a trend analysis system for tracking data changes over a period, according to an embodiment. A trend analysis system 3000 may include a computing device 300 and a database 360. The computing device 300 may have a configuration similar to that of computing system 400 (see FIG. 4).

The database 360 may store or provide (1) status/period data 362, (2) change tracking data 364, and/or (3) report data 366. In some embodiments, these data (1)-(3) may be stored as logical tables in one or more databases (e.g., relational databases). For example, the status/period data 362 may be stored as an input table for tracking status changes. The change tracking data 364 may be generated and stored as a change tracking table. The report data 366 may be generated and stored as a report table. In some embodiments, the trend analysis system 3000 may create/generate a change tracking view and a report view instead of storing change tracking data or report data in the database 360.

The computing device 300 may include a change tracker 320 and a graph generator 340. The change tracker 320 may be a software module, which may be executed by the computing device 300. The change tracker 320 may be configured to access data from, or store data into, the database 360. In some embodiments, the change tracker 320 may use a Structured Query Language (SQL) interface or module to access data from, or store data into, the database 360. The change tracker 320 may be configured to track data changes over a period using data generated over a plurality of subperiods (e.g., divided portions or subdivisions) of a period. For example, data changes over a 3 month period may be tracked using (daily) data generated over each day of the 3 month period. In some embodiments, the change tracker 320 may include a change tracking data generator 322 and a report view generator 324. The change tracking data generator 322 may be configured to generate a snapshot view (or change tracking view) which can show, as rows, the status of an item (e.g., an insurance policy or a check) over subperiods (e.g., days) of a time period. The report view generator 324 may be configured to generate a report view which can show, as rows, the number of items per different statuses over the subperiods (e.g., days) of the time period.

The graph generator 340 may be a software module, which may be executed by the computing device 300. The graph generator 340 may be configured to communicate with the change tracker 320 via inter-process communication (PC). The graph generator 340 may be configured to access data from, or store data into, the database 360. In some embodiments, the graph generator 340 may use an SQL interface or module to access data from, or store data into, the database 360. The graph generator 340 may be configured to one or more graphs based on a report view generated by the report view generator 324.

Figure 3B:
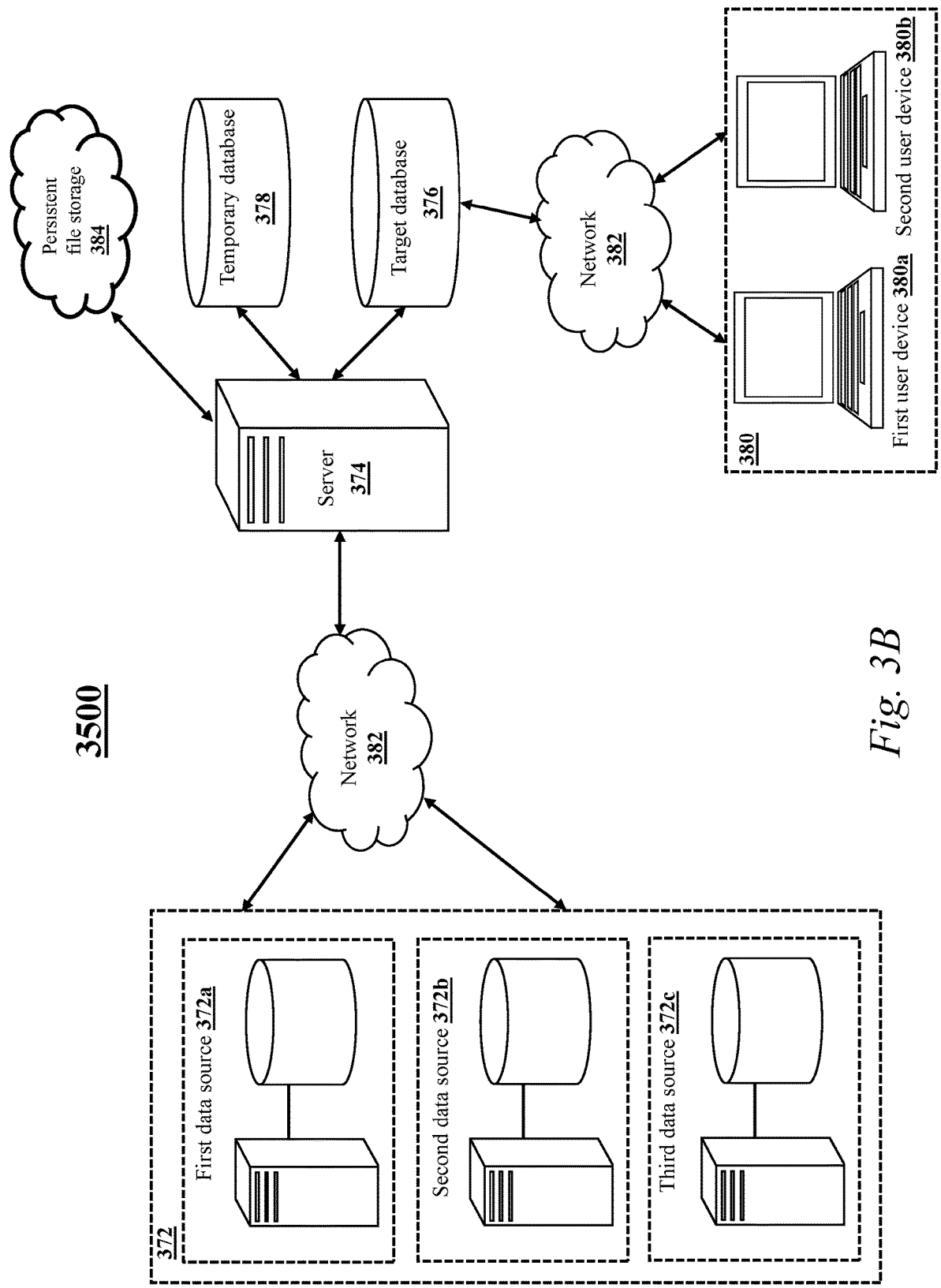
FIG. 3B is a block diagram showing another system for tracking data changes over a period, according to an embodiment.

FIG. 3B is a block diagram showing a system for tracking data changes over a period, according to an embodiment. The system 3500 may be a database management system employed by a company to periodically update data stored within the company's data repositories. The system 3500 may include data sources 372a-c (collectively data sources 372), a server 374, a target database 376, a temporary database 378, a persistent file storage 384, and user devices 380. The data sources 372 may include, but not limited to, a first data source 372a, a second data source 372b, and a third data source 372c. The user devices 380 may include, but not limited to, a first user device 380a and a second user device 380b.

The data sources 372, the server 374, the target database 376, the temporary database 378, and the user devices 380 may be connected to each other and communicate via a network 382. The network 382 may include, but is not limited to, private or public local area network, wireless local area network, metropolitan area network, wide-area network, and the Internet. The network 382 may further include both wired and wireless communications, according to one or more standards, via one or more transport mediums. The communication over the network 382 may be performed in accordance with various communication protocols, such as, transmission control protocol and internet protocol, user datagram protocol, and institute of electrical and electronics engineers communication protocols. The network 382 may further include wireless communications, according to Bluetooth specification sets, or another standard or proprietary wireless communication protocol. The network 382 may further include communications over a cellular network, including, for example, a global system for mobile communications, code division multiple access, and enhanced data for global evolution network.

The system 3500 may operate in a local computing environment where the server 374 may receive and execute a request. The request may be to update one or more data tables of the target database 376 with new data records generated by the data sources 372. The data sources 372, the one or more data tables of the target database 376, and software programs (for example, a machine learning algorithm) associated with the server 374 may be stored and executed on local computing resources. The server 374 may locally query the data sources 372 to retrieve the new data records associated with the request. The server 374 may initially transmit the new data records associated with the request to one or more data tables of the temporary database 378. The server 374 may execute a software algorithm to merge the new data records present within the one or more data tables of the temporary database 378 and old data records present within the one or more data tables of the target database 376 to update the one or more data tables in the target database 376 with the new data records obtained from the data sources 372.

The one or more data tables of the target database 376 may be one or more multi-dimensional data tables, which may store all data records (for example, the old and new data records). The data records within the one or more data tables of the target database 376 may be organized, summarized, consolidated, categorized, and synthesized according to multiple dimensions to reflect the multidimensional nature of the data records. The user devices 380 may directly or indirectly access the target database 376 at any time to retrieve the data records. The user devices 380 may process the data records to generate reports. The reports may be dynamic such that information within the reports may be updated when underlying data records within the reports are changed in the one or more data tables of the target database 376. The reports may be presented on an interactive graphical user interface of the user devices 380.

The system 3500 may be implemented in a cloud-computing environment where various devices of the system 3500 may be cloud-optimized. The cloud computing described herein may be a model for enabling convenient, on-demand network access to a shared pool of configurable computing resources (e.g., networks, processors, storage, applications, and services) that can be rapidly provisioned and released with minimal management effort or service provider interaction. The cloud-computing environment may provide computation, software, data access, and storage services that do not require end-user knowledge of the physical location and configuration of the system 3500 that delivers the services. The cloud-computing infrastructure may be delivered through common centers, built-on servers, and memory resource. In this embodiment, all or some of system the 3500 may be implemented in a cloud infrastructure environment. For example, the data sources 372 and the one or more data tables of the target database 376 may reside in a cloud environment. Likewise, the server 374 and the network 382 may all reside in a cloud-computing environment, where resources are allocated on an as needed basis. The data sources 372, the one or more data tables of the target database 376, and application programs may be stored and executed on a remote cloud-based server 374 accessed over a network cloud.

Data sources 372 may include information (for example, new data records) derived from external and secondary data servers, such as bank servers, insurance company servers, stock exchange servers, financial company servers, fraud detection company servers, social media company websites, social media company servers, third party data providers, and any suitable external source required for the proper functioning of the system 3500. The external and secondary data servers may generate the new data records. The external and secondary data servers may periodically feed the new data records into the data sources 372. The external and secondary data servers may feed the new data records into the data sources 372 only in response to receiving an electronic request from a processor associated with the data sources 372.

The data sources 372 may include the first data source 372a, the second data source 372b, and the third data source 372c. The first data source 372a may be user bank records data source. The first data source 372a may be associated with a bank. The first data source 372a may include a first data server and a first database. The first data server may generate the new data records such as various bank data records based on banking activity of customers. The first data server may obtain various bank data records of the customers from external and secondary banking servers. The first data server may store the bank data records in the first database. The first data server may transmit the bank data records stored in the first database to the one or more data tables of the target database 376, via the server 374 and the one or more data tables of the temporary database 378. In another embodiment, the server 374 may retrieve the bank data records from the first database of the first data source 372a and transmit the bank data records to the one or more data tables of the target database 376 via the one or more data tables of the temporary database 378.

The second data source 372b may be user insurance records data source. The second data source 372b may be associated with an insurance company. The second data source 372b may include a second data server and a second database. The second data server may generate the new data records such as various insurance data records based on insurance activity of customers. The second data server may obtain various insurance data records of the customers from external and secondary insurance servers. The second data server may store the insurance data records in the second database. The second data server may transmit the insurance data records stored in the second database to the one or more data tables of the target database 376, via the server 374 and the one or more data tables of the temporary database 378. In another embodiment, the server 374 may retrieve the insurance data records from the second database of the second data source 372b and transmit the insurance data records to the one or more data tables of the target database 376 via the one or more data tables of the temporary database 378.

The third data source 372c may be user personal and fraud records data source. The third data source 372c may be associated with a fraud company. The third data source 372c may include a third data server and a third database. The third data server may generate the new data records such as various fraud history data records based on fraud activity of customers. The third data server may obtain various fraud history data records of the customers from external and secondary fraud monitors servers. The third data server may store the fraud history data records in the third database. The third data server may transmit the fraud history data records stored in the third database to the one or more data tables of the target database 376, via the server 374 and the one or more data tables of the temporary database 378. In another embodiment, the server 374 may retrieve the fraud history data records from the third database of the third data source 372c and transmit the fraud history data records to the one or more data tables of the target database 376 via the one or more data tables of the temporary database 378. Each data table of the target database 376 and the temporary database 378 may include one or more data columns.

A server 374 is a computing device. The server 374 may include a processing unit, and a non-transitory machine-readable storage medium. The processing unit may include a processor with a computer-readable medium, such as a random access memory coupled to the processor. The server 374 may be executing algorithms or computer executable program instructions, which may be executed by a single processor or multiple processors in a distributed configuration. The server 374 may be configured to interact with one or more software modules of a same or different type operating within the system 3500.

User devices 380 may be computing devices, which may include a processing unit. The processing unit may execute a web browser application to access or receive data records stored in the target database 376. The processing unit may include a processor with a computer-readable medium, such as a random access memory coupled to the processor. The user devices 380 may be running algorithms or computer executable program instructions, which may be executed by a single processor or multiple processors in a distributed configuration. The user devices 380 may be configured to interact with one or more software modules of a same or different type operating within the system 3500.

In operation, the methods and systems disclosed herein allow data to be transferred/merged from the data sources 372 to the target database 376. The server 374 may generate the temporary database 378 (sometimes refer to as the work data repository) with a similar configuration as the target database 376. The server 374 may then transmit the data to the temporary database 378. When the data is stored within temporary database 378, the server 374 may perform the needed data transformation operations (e.g., transforming the data into a desired data format or into a data format consistent with the target database 376). The server 374 can also retrieve related data records from the target database 376 and/or the data sources 372. The server 374 may store the retrieved data records onto the temporary database 378 to support the data transformation operations. The server 374 may also execute dependency identification protocols and identify whether the data stored within the temporary database 378 has any related data records. The server 374 may then merge the data stored within the temporary database 378 with the data stored within the target database 376.

Figure 4:
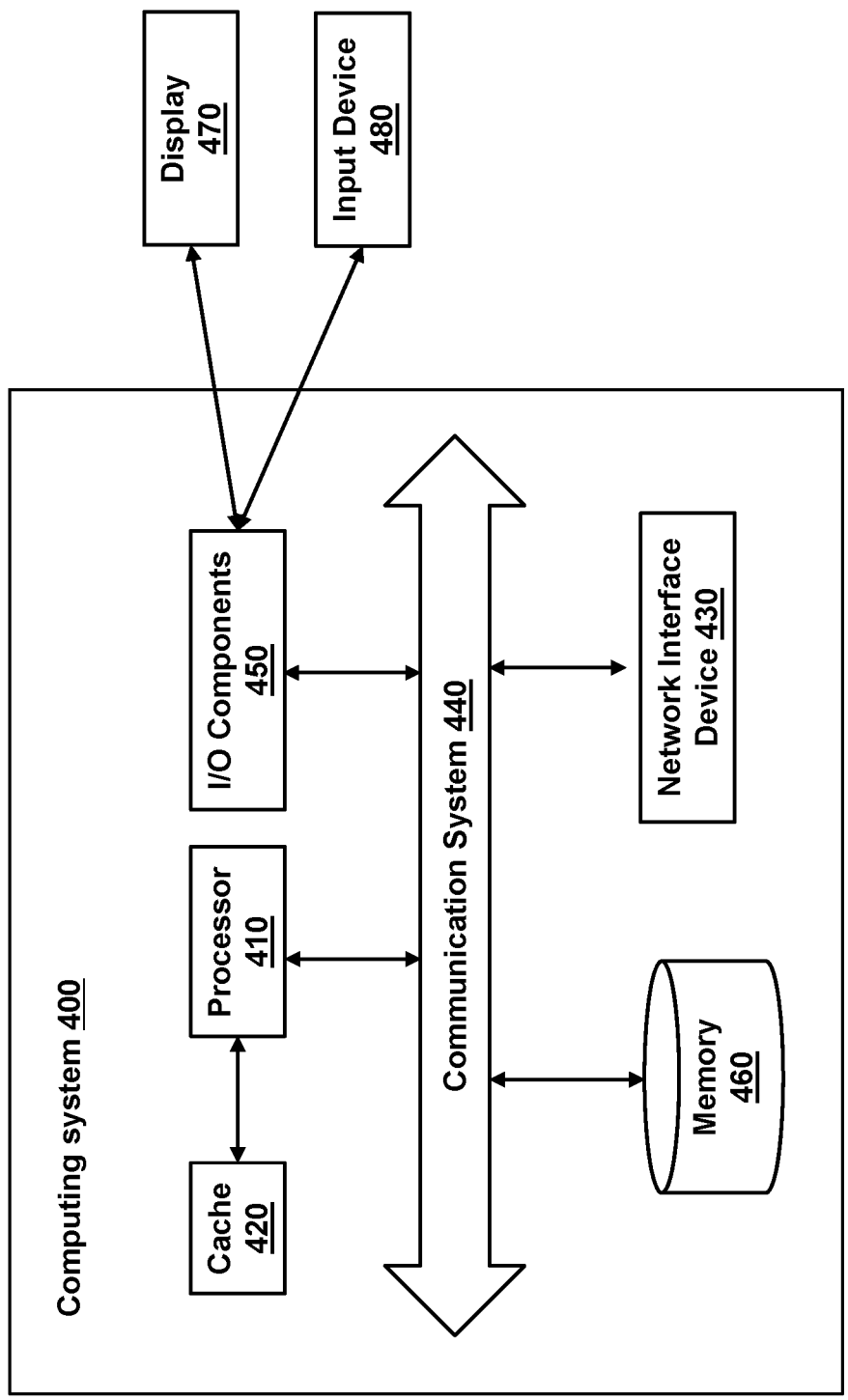
FIG. 4 is a block diagram showing an example of a computing system, according to an embodiment.

FIG. 4 is a block diagram showing an example of a computing system, according to an embodiment. An illustrated example computing system 400 includes one or more processors 410 in communication, via a communication system 440 (e.g., bus), with memory 460, at least one network interface controller 430 with network interface port for connection to a network (not shown), and other components, e.g., input/output ("I/O") components 450. Generally, the processor(s) 410 will execute instructions (or computer programs) received from memory. The processor(s) 410 illustrated incorporate, or are directly connected to, cache memory 420. In some instances, instructions are read from memory 460 into cache memory 420 and executed by the processor(s) 410 from cache memory 420.

In more detail, the processor(s) 410 may be any logic circuitry that processes instructions, e.g., instructions fetched from the memory 460 or cache 420. In many implementations, the processor(s) 410 are microprocessor units or special purpose processors. The computing device 400 may be based on any processor, or set of processors, capable of operating as described herein. The processor(s) 410 may be single core or multi-core processor(s). The processor(s) 410 may be multiple distinct processors.

The memory 460 may be any device suitable for storing computer readable data. The memory 460 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 400 may have any number of memory devices 460.

The cache memory 420 is generally a form of computer memory placed in close proximity to the processor(s) 410 for fast read times. In some implementations, the cache memory 420 is part of, or on the same chip as, the processor(s) 410. In some implementations, there are multiple levels of cache 420, e.g., L2 and L3 cache layers.

The network interface controller 430 manages data exchanges via the network interface (sometimes referred to as network interface ports). The network interface controller 430 handles the physical and data link layers of the OSI model for network communication. In some implementations, some of the network interface controller's tasks are handled by one or more of the processor(s) 410. In some implementations, the network interface controller 430 is part of a processor 410. In some implementations, the computing system 400 has multiple network interfaces controlled by a single controller 430. In some implementations, the computing system 400 has multiple network interface controllers 430. In some implementations, each network interface is a connection point for a physical network link (e.g., a cat-5 Ethernet link). In some implementations, the network interface controller 430 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 430 implements one or more network protocols such as Ethernet. Generally, a computing device 400 exchanges data with other computing devices via physical or wireless links through a network interface. The network interface may link directly to another device or to another device via an intermediary device, e.g., a network device such as a hub, a bridge, a switch, or a router, connecting the computing device 300 to a data network such as the Internet.

The computing system 400 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 400 may include an interface (e.g., a universal serial bus (USB) interface) for connecting input devices, output devices, or additional memory devices (e.g., portable flash drive or external media drive). In some implementations, a computing device 400 includes an additional device such as a co-processor, e.g., a math co-processor can assist the processor 410 with high precision or complex calculations.

The components 450 may be configured to connect with external media, a display 470, an input device 480 or any other components in the computing system 400, or combinations thereof. The display 470 may be a liquid crystal display (LCD), an organic light emitting diode (OLED), a flat panel display, a solid state display, a cathode ray tube (CRT), a projector, a printer or other now known or later developed display device for outputting determined information. The display 370 may act as an interface for the user to see the functioning of the processor(s) 410, or specifically as an interface with the software stored in the memory 460.

The input device 480 may be configured to allow a user to interact with any of the components of the computing system 400. The input device 480 may be a plurality pad, a keyboard, a cursor control device, such as a mouse, or a joystick. Also, the input device 480 may be a remote control, touchscreen display (which may be a combination of the display 470 and the input device 480), or any other device operative to interact with the computing system 400, such as any device operative to act as an interface between a user and the computing system 400.

FIG. 5 is a diagram depicting example data for tracking data changes over a period, according to an embodiment (first embodiment). In the first embodiment, referring to FIG. 5, a trend analysis system may receive an input table 500 including a row R1 (511), which has columns C1 (521)-C5 (528) including a key 521, a check number 522, a party ID 523, a transaction date 524, a status 525, an amount 526, and a corresponding period defined with a begin date 527 and an end date 528. The system may generate, based on the input table 500, a change tracking view 550. The change tracking view 550 may include rows R1 (561)-R5 (565), each having columns C1 (571)-C5 (579) including a key 571, an as-of-date 572, a check number 573, a party ID 574, a transaction date 575, a status 576, an amount 577, and a corresponding period defined with a begin date 578 and an end date 578.

In the first embodiment, given a status (e.g., status column 525) with a corresponding period (e.g., begin date 527, end date 528) in the input table 500, the trend analysis system (e.g., change tracking data generator 322) may create/generate a snapshot view (or change tracking view) 550 which can show/portray/indicate the daily status (e.g., status 576) of a check as rows having repeated records R1 (561)-R5 (565) over subperiods of the period (e.g., days of the period 10/1/2021 to 10/5/2021). The snapshot view or change tracking view 550 may be created/generated as a result of a database query (e.g., SQL). Given a plurality of records or rows (e.g., R1 (511)) in the input table 500, each record representing/indicating a status of the check (e.g., status 525) with a corresponding period defined with a begin date (e.g., begin date 527) and an end date (e.g., end date 528), the trend analysis system (e.g., change tracking data generator 322) may create/generate a change tracking view by replicating/repeating/accumulating each record (e.g., R1 511 in the input table 500 5 times between the begin date and the end date (e.g., 10/1/2021 to 10/5/2021). In some embodiments, the change tracking view 550 may be implemented as a logical view in an EDAP using an ED. In the change tracking view 550, the system may use a column representing a date (e.g., "as of date" column 572) to report the status of the check for any given day. The first embodiment can be easy to implement by replicating the same record over subperiods of a period and may not incur much burden to build and maintain additional data points (because the input records can be replicated to be maintained in the change tracking view). The first embodiment, however, may use large computing resources (e.g., processor, memory, or disk) because the number of duplicate records increases exponentially for input records associated with a given period. For example, in an implementation, it may take 20 minutes to build an intermediate data structure (e.g., change tracking table) for all check transactions for a 10 day time period.

In the second embodiment, the trend analysis system 3000 may obtain a result of a database query in a manner similar to the first embodiments as shown in FIG. 5, but store the result in one or more physical tables (or projections) instead of creating/generating a view as done in the first embodiment. For example, given a status with a corresponding period in an input table, the trend analysis system (e.g., change tracking data generator 322) may create/generate a change tracking table or projection which has a structure similar to that of the change tracking view 550. The change tracking table or projection may be built/created/generated as a static projection for a pre-determined set of as-of-dates to enforce a database system to reference the table or projection created. In this manner, the trend analysis system can store result sets of a database query in a disk as the change tracking table or projection, rather than computing the result sets each time the query is used in a program (as done in the first embodiment). The database system may automatically refresh/update these result sets whenever input data are updated or new input data are received. The second embodiment can utilize additional projections on existing tables without replicating/repeating/accumulating data points programmatically. The second embodiment, however, may need frequent refreshes/updates on the projections, which may incur an I/O overload processing job, so that the memory and I/O overhead are not reduced as compared with the first embodiment.

FIG. 6A and FIG. 6B are diagrams depicting another example data for tracking data changes over a period, according to an embodiment (third embodiment). Referring to FIG. 6A, a trend analysis system (e.g., change tracking data generator 322) may receive an input table 600 including rows R1 (611)-R4 (616) each having columns C1 (621)-C5 (628) including a key 621, a check number 622, an insured name 623, a check date 624, a status 625, an amount 626, and a corresponding period defined with a begin date 627 and an end date 628. The system (e.g., change tracking data generator 322) may generate, based on the input table 600, a change tracking table 630. The change tracking table 630 may include rows R1 (631)-R12 (642), each having columns C1 (651)-C5 (655) including a key 651, an as-of-date 652, a status of "waiting to post" 653, a status of "outstanding" 654, and a status of "cleared" 652.

In the third embodiment, instead of building an accumulating snapshot view (or table/projection) as shown in FIG. 5, the trend analysis system (e.g., change tracking data generator 322) may create/generate a bitmap table (as a change tracking table) 630 that tracks the record status or status change for each subperiod of a given period (e.g., for each day of a period between 10/1/2021 and 10/9/2021). For every record given in the input table 600, the system may create one or more physical change tracking tables (e.g., change tracking table 630) that track/indicate/show the change in status (e.g., in columns 653, 654, 655) using a binary flag (e.g., 0 or 1). In some embodiments, the change in status may be tracked/indicated/shown by any column whose cardinality is 2 (e.g., the number of unique values in the column is 2). The column for use in tracking the change in status (e.g., columns 653, 654, 655) may have one of an integer type or a binary type. In some embodiments, the system may create one or more change tracking views (instead of physical tables) that track/indicate/show the change in status using a binary flag.

Referring to FIG. 6B, the trend analysis system (e.g., report view generator 324) may join the input table 600 and the change tracking table 630 to generate a report 670 including rows R1 (671)-R10 (682). The rows R1 (671)-R3 (682) may each have columns C1 (691)-C5 (699) including a key 691, an as-of-date 692, a check number 693, an insured name 694, a check date 695, an amount 696, a status of "waiting to post" 697, a status of "outstanding" 698, and a status of "cleared" 699. The system (e.g., report view generator 324) may create/generate the report view 670 by combining or joining the input table 600 and the change tracking table 630. The report view 670 may be used to report or track change status over a given period (e.g., change in status of checks over a 9 days period in FIG. 6B).

Referring to FIG. 6A and FIG. 6B, the trend analysis table 630 may track the status change of a check (e.g., subscriber or person's check) during a transaction. The system (e.g., change tracking data generator 322) may receive data as the input table 600, which indicates status changes of one or more checks for a given period (e.g., 10/1/2021 to 10/9/2021). In order to report a change of the status over the given period, the system (e.g., change tracking data generator 322) may create a bitmap table (as a change tracking table) 630 to track only the change of the status using status columns 653, 654, 655 (without other information such as amount of the check, check number, etc.). The system may track the status change using one or more columns of an integer type or a binary type (e.g., status columns 653, 654, 655) in the change tracking table 630, the footprint (e.g., storage space) of the change tracking table can be very light. In some embodiments, the one or more columns may be added (or stored) to a physical table if additional status records are getting added. In some embodiments, the system (e.g., report generator 324) may join the input table 600 and the bitmap table (as a change tracking table) 630 to create/generate a report view 670 for reporting purpose. By creating a report view (e.g., report view 670), the system can report many months of check status trends (e.g., number of checks per status) within seconds.

Figure 7:
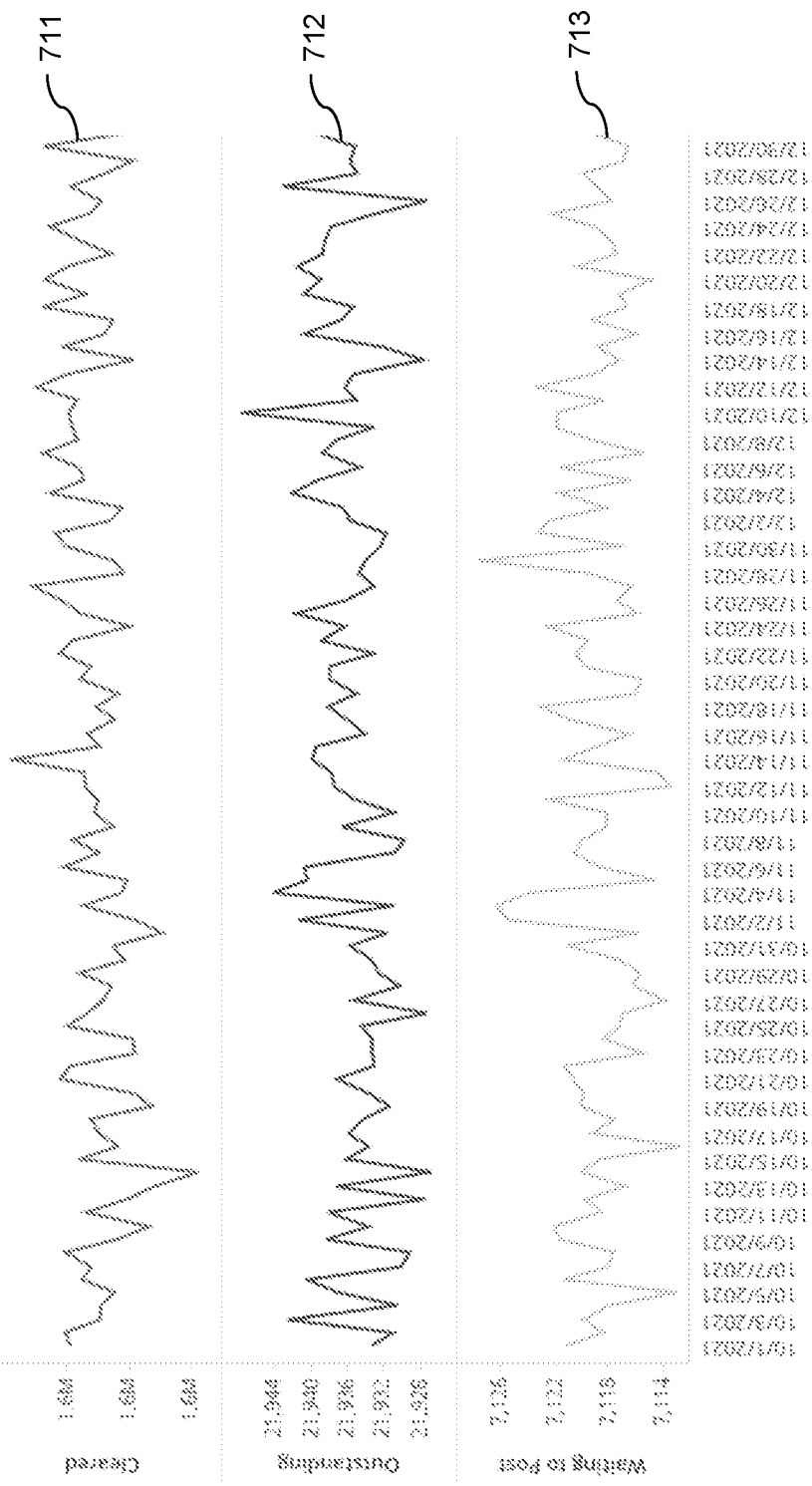
FIG. 7 is a diagram depicting an example result of tracking data changes over a period, according to an embodiment.

FIG. 7 is a diagram 700 depicting an example result of tracking data changes over a period, according to an embodiment. In some embodiments, the trend analysis system (e.g., graph generator 340) may generate one or more graphs based on a change tracking table (e.g., report view 630) or a report view (e.g., report view 670). Based on the change tracking table or the report view, the system (e.g., graph generator 340) can generate statistical information (e.g., total number of checks per status for each day, or sum of check amounts per status for each day). In some embodiments, the graph generator 340 may generate/calculate/compute the total number checks per status for each day by summing up the columns level for each day (e.g., counting the records with a value of 1 in "waiting to post" column 653, 697, the "outstanding" column 654, 698, and "cleared" column 655, 699) in the change tracking table or the report view. In some embodiments, the graph generator 340 may generate/calculate/compute the sum of check amounts per status for each day by (1) multiplying an amount column (e.g., column 696 in the report view 670) and a status column (e.g., "waiting to post" column 697, the "outstanding" column 698, and "cleared" column 699 in the report view 670) in each record of the report view; and (2) aggregating or summing up the multiplication results on a given time (e.g., particular day) as the sum of amount pending in a given status on the given time.

For example, referring to FIG. 7, the graph generator 340 may calculate/obtain/compute the total number of checks per status 702 for as-of-date 701 by counting the records with a value of 1 in each status column of for each day of a given period (e.g., 3 months period from 10/1/2021 to 12/30/2021 in FIG. 7) in a change tracking table (e.g., change tracking table 630) or a report view (e.g., report view 670). The status columns may include "waiting to post" column 653, 697, the "outstanding" column 654, 698, and "cleared" column 655, 699. The system (e.g., graph generator 340) may then generate (1) a line graph 711 representing the changes in the total number of checks with the "cleared" status; (2) a line graph 712 representing the changes in the total number of checks with the "outstanding" status; and (3) a line graph 713 representing the changes in the total number of checks with the "waiting to post" status, for a given period of time (e.g., 3 months period from 10/1/2021 to 12/30/2021).

Figure 8:
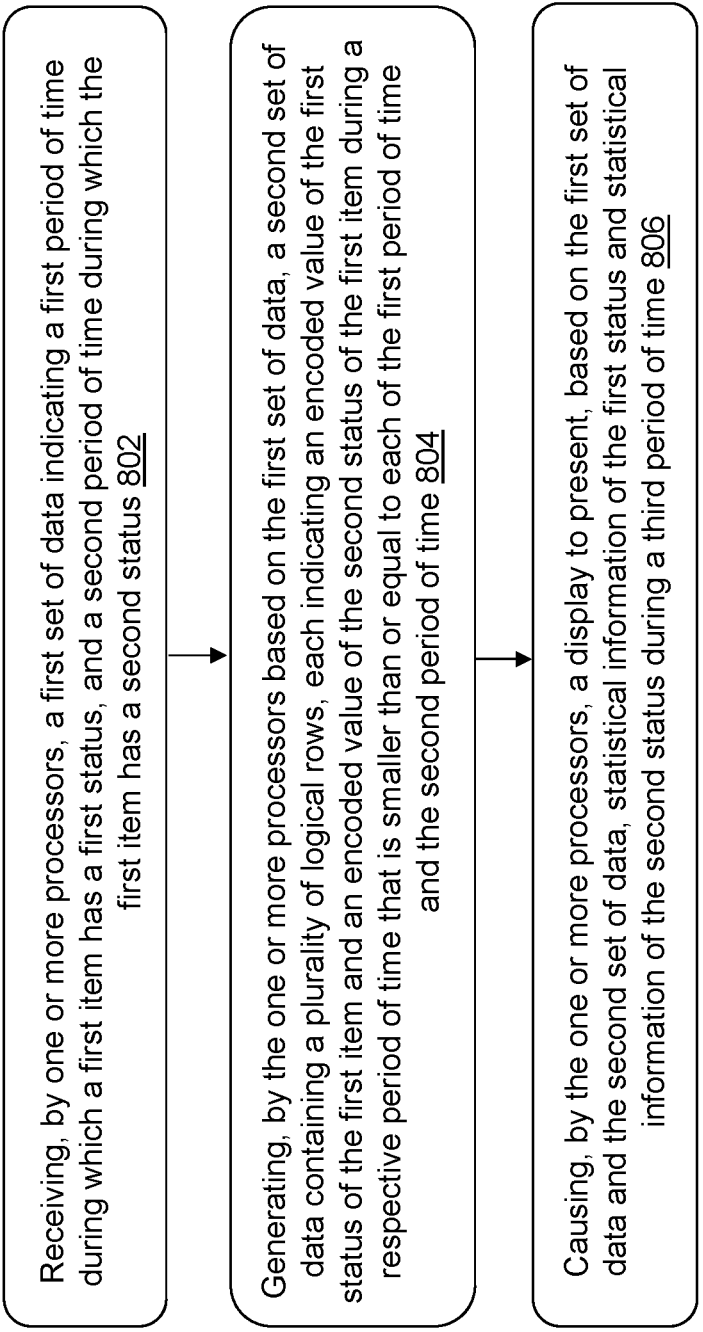
FIG. 8 is a flowchart illustrating a methodology for tracking data changes over a period, according to an embodiment.

FIG. 8 is a flowchart illustrating a methodology for tracking data changes over a period, according to an embodiment. FIG. 8 shows execution steps for executing processes based on metadata, according to a method 800. The method 800 may include execution steps 802, 804 and 806 performed in a risk modelling/analysis system (e.g., system 3000 in FIG. 3A) including one or more processors (e.g., processor 410 in FIG. 4). It should be understood that the steps described herein are merely illustrative and additional or substitute steps should also be considered to be within the scope of this disclosure. Furthermore, methods with a fewer numbers of steps should also be considered to be within the scope of this disclosure.

At step 802, the one or more processors may receive a first set of data (e.g., input table 600) indicating a first period of time (e.g., one day period from 10/9/2021 to 10/9/2021 defined by the begin date 627 and the end date 628 in the record 613) during which a first item (e.g., check with check number 165) has a first status (e.g., "cleared" in the status column 625 in the record 613), and a second period of time (e.g., 3 day period from 10/6/2021 to 10/8/2021 defined by the begin date 627 and the end date 628 in the record 612) during which the first item (e.g., check with check number 165) has a second status (e.g., "outstanding" in the status column 625 in the record 612). In some embodiments, the first item may be one of an insurance policy or a check of an insured person.

At step 804, the one or more processors may generate, based on the first set of data (e.g., input table 600), a second set of data (e.g., change tracking table 630 or report view 670) containing a plurality of logical rows (e.g., records 631-642), each indicating an encoded value of the first status of the first item (e.g., "0" or "1" in "cleared" column 655) and an encoded value of the second status of the first item (e.g., "0" or "1" in "outstanding" column 654) during a respective period of time (e.g., a day) that is smaller than or equal to each of the first period of time (e.g., one day period from 10/9/2021 to 10/9/2021 defined by the begin date 627 and the end date 628 in the record 613) and the second period of time (e.g., 3 day period from 10/6/2021 to 10/8/2021 defined by the begin date 627 and the end date 628 in the record 612). In some embodiments, the respective period may have an identical length (e.g., respective period of each of the records 631-642 is one day).

In some embodiments, each of the plurality of logical rows in the second set of data may include the encoded value of the first status of the first item as a value of a first logical column (e.g., "cleared" column 655), and the encoded value of the second status of the first item as a value of a second logical column (e.g., "outstanding" column 654).

At step 806, the one or more processors may cause a display (e.g., display 470) to present, based on the first set of data (e.g., input table 600) and the second set of data (e.g., change tracking table 630 or report view 670), statistical information of the first status (e.g., total number of checks for "cleared" status 711 in FIG. 7) and statistical information of the second status (e.g., total number of checks for "outstanding" status 712 in FIG. 7) during a third period of time (e.g., 3 month period in FIG. 7).

In some embodiments, the one or more processors may calculate the statistical information of the first status (e.g., total number of checks with "cleared" status) by summing values of the first logical column over the respective period of time (e.g., summing values of the "cleared" column 655 over each day defined in "as of date" column 652 or summing values of the "cleared" column 699 over each day defined in "as of date" column 692). The one or more processors may calculate the statistical information of the second status (e.g., total number of checks with "outstanding" status) by summing values of the second logical column over the respective period of time (e.g., summing values of the "outstanding" column 654 over each day defined in "as of date" column 652 or summing values of the "outstanding" column 698 over each day defined in "as of date" column 692).

In some embodiments, each of the plurality of logical rows in the second set of data further may include an amount relating to the first item as a value of a third logical column (e.g., amount column 696). The one or more processors may multiply, in each of the plurality of logical rows, the value of the first logical column (e.g., "cleared" column 699) by the value of the third logical column (e.g., amount column 696). to obtain a respective multiplication result. The one or more processors may calculate the statistical information of the first status (e.g., sum of check amounts with "cleared" status) by summing respective multiplication results over the respective period of time (e.g., summing the multiplication results on a daily basis). For example, referring to FIG. 6B, the sum of check amount with "cleared" status on the day of 10/9/2021 (e.g., $300) may be calculated/obtained/computed by (1) multiplying a value of the check amount column 696 (e.g., $100) by a value of the "cleared" status column 699 (e.g., "1") for the record 679; (2) multiplying a value of the check amount column 696 (e.g., $200) by a value of the "cleared" status column 699 (e.g., "1") for the record 682; and (3) summing respective multiplication results ($100+$200) over the respective period of time (e.g., the day of 10/9/2021).

In some embodiments, the first set of data (e.g., input table 600) may contain a first logical row (e.g., record 613) including the first status of the first item (e.g., "cleared") as a value of a status column (e.g., status 625) and the first period of time as a value of a period column (e.g., begin date 627, end date 628). The first set of data may contain a second logical row (e.g., record 612) including the second status of the first item (e.g., "outstanding") as a value of the status column (e.g., status 625) and the second period of time as a value of the period column (e.g., begin date 627, end date 628).

In some embodiments, the first set of data (e.g., input table 600) may indicate a fourth period of time (e.g., period from 10/9/2021 to 10/9/2021 in record 616) during which a second item (e.g., check with check number 561) has the first status (e.g., "cleared"), and a fifth period of time (e.g., period from 10/8/2021 to 10/8/2021 in record 615) during which the second item has the second status (e.g., "outstanding"). Each of the plurality of logical rows in the second set of data (e.g., change tracking table 630 or report view 670) may include an encoded value of the first status of the first item or the second item as a value of a first logical column (e.g., "cleared" column 655 or "cleared" column 699), and an encoded value of the second status of the first item or the second item as a value of a second logical column (e.g., "outstanding" column 654 or "outstanding" column 698).

In some embodiments, the one or more processors may calculate the statistical information of the first status (e.g., total number of checks with the first status "cleared") by summing values of the first logical column (e.g., "cleared" column 655 or "cleared" column 699) over the respective period of time (e.g., daily). The one or more processors may calculate the statistical information of the second status (e.g., total number of checks with the first status "outstanding") by summing values of the second logical column (e.g., "outstanding" column 654 or "outstanding" column 698) over the respective period of time (e.g., daily).

In some embodiments, each of the plurality of logical rows in the second set of data (e.g., report view 670) may include an amount relating to the first item or the second item as a value of a third logical column (e.g., amount column 696). The one or more processors may multiply, in each of the plurality of logical rows, the value of the first logical column (e.g., "cleared" column 655 or "cleared" column 699) by the value of the third logical column (e.g., amount column 696) to obtain a respective multiplication result. The one or more processors may calculate the statistical information of the first status (e.g., sum of check amounts with status "cleared") by summing respective multiplication results over the respective period of time (e.g., daily).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by one or more processors, a first set of data indicating a first period of time during which a first item has a first status, and a second period of time during which the first item has a second status;
   generating, by the one or more processors based on the first set of data, a second set of data containing a plurality of logical rows, each logical row indicating an encoded value of the first status of the first item and an encoded value of the second status of the first item during a respective period of time that is smaller than or equal to each of the first period of time and the second period of time, wherein the generating further comprises dividing the first period of time into discrete intervals each corresponding to a logical row in the second set of data and assigning the encoded values within each logical row based on the discrete intervals;
   generating, by the one or more processors, an index table to track a change of the first or second status;
   generating, by the one or more processors, a snapshot view from the index table that displays the first or second status of the first item over the discrete intervals, the snapshot view showing at least one change in the first or second status over each interval; and
   causing, by the one or more processors, a display to present, based on the first set of data and the second set of data, statistical and temporal information of the first status and statistical information of the second status during a third period of time.

2. The method of claim 1, wherein the first item is one of an insurance policy or a check of an insured person.

3. The method of claim 1, wherein the respective period has an identical length.

4. The method of claim 1, wherein each of the plurality of logical rows in the second set of data comprises the encoded value of the first status of the first item as a value of a first logical column, and the encoded value of the second status of the first item as a value of a second logical column.

5. The method of claim 4, further comprising:
   calculating the statistical information of the first status by summing values of the first logical column over the respective period of time; and
   calculating the statistical information of the second status by summing values of the second logical column over the respective period of time.

6. The method of claim 4, wherein
   each of the plurality of logical rows in the second set of data further comprises an amount relating to the first item as a value of a third logical column,
   the method further comprising:
   multiplying, in each of the plurality of logical rows, the value of the first logical column by the value of the third logical column to obtain a respective multiplication result; and
   calculating the statistical information of the first status by summing respective multiplication results over the respective period of time.

7. The method of claim 1, wherein the first set of data contains:

a first logical row including the first status of the first item as a value of a status column and the first period of time as a value of a period column, and a second logical row including the second status of the first item as a value of the status column and the second period of time as a value of the period column.

8. The method of claim 1, wherein the first set of data further indicates a fourth period of time during which a second item has the first status, and a fifth period of time during which the second item has the second status, and each of the plurality of logical rows in the second set of data comprises an encoded value of the first status of the first item or the second item as a value of a first logical column, and an encoded value of the second status of the first item or the second item as a value of a second logical column.

9. The method of claim 8, further comprising:

calculating the statistical information of the first status by summing values of the first logical column over the respective period of time; and calculating the statistical information of the second status by summing values of the second logical column over the respective period of time.

10. The method of claim 8, wherein each of the plurality of logical rows in the second set of data further comprises an amount relating to the first item or the second item as a value of a third logical column, the method further comprising:

multiplying, in each of the plurality of logical rows, the value of the first logical column by the value of the third logical column to obtain a respective multiplication result; and calculating the statistical information of the first status by summing respective multiplication results over the respective period of time.

11. A system comprising:

one or more processors configured to execute instructions stored on a non-transitory computer-readable medium, configured to:

receive a first set of data indicating a first period of time during which a first item has a first status, and a second period of time during which the first item has a second status;

generate, based on the first set of data, a second set of data containing a plurality of logical rows, each logical row indicating an encoded value of the first status of the item and an encoded value of the second status of the item during a respective period of time that is smaller than or equal to each of the first period of time and the second period of time, wherein the generating further comprises dividing the first period of time into discrete intervals each corresponding to a logical row in the second set of data and assigning the encoded values within each logical row based on the discrete intervals;

generate an index table to track a change of the first or second status;

generate a snapshot view from the index table that displays the first or second status of the first item over the discrete intervals, the snapshot view showing at least one change in the first or second status over each interval; and cause a display to present, based on the first set of data and the second set of data, statistical and temporal information of the first status and the second status during a third period of time.

12. The system of claim 11, wherein the first item is one of an insurance policy or a check of an insured person.

13. The system of claim 11, wherein the respective period has an identical length.

14. The system of claim 11, wherein each of the plurality of logical rows in the second set of data comprises the encoded value of the first status of the first item as a value of a first logical column, and the encoded value of the second status of the first item as a value of a second logical column.

15. The system of claim 14, wherein the one or more processors are further configured to:

calculate the statistical information of the first status by summing values of the first logical column over the respective period of time; and calculate the statistical information of the second status by summing values of the second logical column over the respective period of time.

16. The system of claim 14, wherein each of the plurality of logical rows in the second set of data further comprises an amount relating to the first item as a value of a third logical column, and the one or more processors are further configured to:

multiply, in each of the plurality of logical rows, the value of the first logical column by the value of the third logical column to obtain a respective multiplication result; and calculate the statistical information of the first status by summing respective multiplication results over the respective period of time.

17. The system of claim 11, wherein the first set of data contains:

a first logical row including the first status of the first item as a value of a status column and the first period of time as a value of a period column, and a second logical row including the second status of the first item as a value of the status column and the second period of time as a value of the period column.

18. The system of claim 11, wherein the first set of data further indicates a fourth period of time during which a second item has the first status, and a fifth period of time during which the second item has the second status, and each of the plurality of logical rows in the second set of data comprises an encoded value of the first status of the first item or the second item as a value of a first logical column, and an encoded value of the second status of the first item or the second item as a value of a second logical column.

19. The system of claim 18, wherein the one or more processors are further configured to:

calculate the statistical information of the first status by summing values of the first logical column over the respective period of time; and calculate the statistical information of the second status by summing values of the second logical column over the respective period of time.

20. The system of claim 18, wherein each of the plurality of logical rows in the second set of data further comprises an amount relating to the first item or the second item as a value of a third logical column, the one or more processors are further configured to:
multiply, in each of the plurality of logical rows, the value of the first logical column by the value of the third logical column to obtain a respective multiplication result; and
calculate the statistical information of the first status by summing respective multiplication results over the respective period of time.

\* \* \* \* \*